United States Patent
Shimizu (10) Patent No.: US 7,858,220 B2
(45) Date of Patent: Dec. 28, 2010

(54) BATTERY ARRAY FOR COOLING BATTERY MODULES WITH COOLING AIR

(75) Inventor: Hideo Shimizu, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 1151 days.

(21) Appl. No.: 11/511,427

(22) Filed: Aug. 29, 2006

(65) Prior Publication Data
US 2007/0046259 A1 Mar. 1, 2007

(30) Foreign Application Priority Data
Aug. 31, 2005 (JP) .............................. 2005-252746

(51) Int. Cl.
*H01M 2/10* (2006.01)
*H01M 10/50* (2006.01)
(52) U.S. Cl. .................... 429/120; 429/96; 429/99; 429/100
(58) Field of Classification Search .................. None
See application file for complete search history.

(56) References Cited
U.S. PATENT DOCUMENTS
6,111,387 A * 8/2000 Kouzu et al. ................ 320/107

FOREIGN PATENT DOCUMENTS

| JP | 11-329518 | 11/1999 |
|---|---|---|
| JP | 2001-313090 | * 11/2001 |
| JP | 2002-50412 | 2/2002 |

* cited by examiner

*Primary Examiner*—Dah-Wei D Yuan
*Assistant Examiner*—Steven Scully
(74) *Attorney, Agent, or Firm*—Wenderoth, Lind & Ponack, L.L.P.

(57) ABSTRACT

A battery array cools battery modules (1) by flowing cooling air through a holder case (2) housing three or more levels of battery modules (1). The holder case (2) has a pair of opposing sidewalls (4) that are closed off by an inlet panel (5) on the inlet side and an outlet panel (6) on the outlet side to form an enclosed chamber (7) that houses battery modules (1). The inlet panel (5) has cooling air intakes (8) opened on both sides. The outlet panel (6) has an exhaust opening (9) at its central region to exhaust cooling air. Opposing sidewalls (4) have projections (10) between adjacent battery modules (1), and the protrusion height of the inner surfaces of those projections (10) increases from upstream to downstream in the cooling air flow.

19 Claims, 8 Drawing Sheets

BATTERY ARRAY FOR COOLING BATTERY MODULES WITH COOLING AIR

BACKGROUND OF THE INVENTION

1. Field of the Invention

This invention relates to a battery array that connects many individual battery cells in series or parallel, and in particular relates primarily to a battery array used as a power source apparatus to power an electric motor that drives an automobile.

2. Description of the Related Art

An electric vehicle such as an electric automobile or hybrid car, which is powered by both an internal combustion engine and an electric motor, uses a battery array of many connected individual battery cells as a power source to supply electric power to the motor for driving.

A battery array used in this type of application should establish high output voltage to supply power to a high output motor. Consequently, many individual battery cells are connected in series and housed in a holder case. For example, battery arrays installed in hybrid cars currently on the market connect several hundred individual battery cells in series to produce output voltages of several hundred volts. In these battery arrays, five or six individual battery cells are connected in series to form a battery module, and many battery modules are housed in a holder case.

A battery array installed in an electric vehicle such as a hybrid car discharges at high currents to speed up the motor when the car accelerates rapidly. In addition, the battery array is charged with high currents via regenerative braking when decelerating or traveling downhill. Consequently, battery temperature can become considerably high. Since use extends to the hot environment of summer months as well, battery temperature can increase even further. Therefore, it is important for a battery array housing many batteries in a holder case to provide efficient and uniform cooling of each battery inside. Various problems arise if temperature differentials develop between the batteries being cooled. For example, a battery that gets hot can degrade and its actual charge capacity at full charge will decrease. If a battery with reduced charge capacity is connected in series and is charged and discharged with the same current as other batteries, it can easily be over-charged or over-discharged. This is because the capacity to which the degraded battery can be fully charged and the capacity that can be completely discharged become smaller. Battery characteristics degrade dramatically with over-charging and over-discharging. Consequently, a battery with reduced actual charge capacity degrades in an accelerated fashion. In particular, if the battery's temperature becomes high, degradation is further increased. As a result, uniform cooling that generates no temperature differentials over any of the batteries is important for a battery array housing many batteries in a holder case.

Various system configurations have been developed to realize this objective (refer to Japanese Patent Laid-Open Publication 2001-313090; Japanese Patent Laid-Open Publication 2002-50412; and Japanese Patent Laid-Open Publication HEI 11-329518 (1999)).

The battery arrays disclosed in JP2001-313090A and JP2002-50412A were previously developed by the present applicant. In those battery arrays, battery modules, which connected a plurality of individual battery cells in a linear fashion, were housed in a parallel orientation within a holder case. Inside the holder case, battery modules were cooled by the forced flow of cooling air across the battery modules. Battery modules were disposed in two levels in the direction of the cooling air flow. Further, a plurality of holder cases was arranged inside an outer case. In such a battery array, output voltage can be adjusted by the number of holder cases housed in the outer case. In addition, each holder case had cooling gaps established between the holder case and the battery modules housed inside. Battery modules were cooled by forcing cooling air flow through the cooling gaps. To cool each battery module uniformly, structural components were disposed between the battery modules stacked in the direction of air flow to control the flow of cooling air.

A battery array with this (prior art) configuration can uniformly cool battery modules stacked in two levels and housed in a holder case. However, if battery modules are stacked inside a holder case in three levels or more to reduce the overall battery array footprint, this type of battery array becomes unable to uniformly cool each battery module.

JP H11-329518 (1999) describes a battery array that houses three levels or more of battery modules inside a holder case. This battery array houses multiple levels of battery modules inside a holder case with battery modules oriented in a parallel fashion and separated in the direction of cooling air flow. This battery array cools battery modules by forcing cooling air flow between battery modules. In this cooling configuration, cooling efficiency is lower for downstream battery modules than for upstream battery modules, and downstream battery modules develop higher temperatures. To resolve this drawback, a turbulence-inducing element such as a dummy battery unit is provided at the most upstream position of the holder case. By disturbing the flow of cooling air introduced into the holder case, battery modules in upstream locations are efficiently cooled. As a configuration to increases cooling efficiency for batteries located downstream, supplemental cooling air intakes are provided in the holder case to capture cooling air at intermediate locations along cooling air pathways.

In this battery array, the cooling efficiency of upstream and downstream battery modules can be improved respectively by turbulent flow and by injecting cooling air at intermediate locations. However, all battery modules cannot be cooled to a uniform temperature with this configuration.

The present invention was developed to further resolve these drawbacks. Thus, it is a primary object of the present invention to provide a battery array that can reduce temperature differentials between a plurality of battery modules housed in a holder case, and can cool battery modules uniformly.

SUMMARY OF THE INVENTION

To achieve the previously mentioned objects, the battery array of the present invention has the following configuration. The battery array cools battery modules, which are individual battery cells connected in a straight-line fashion, by passing cooling air in a direction across those battery modules. Three or more battery modules are stacked in three or more levels in the direction of cooling air flow, and housed in a holder case. A holder case houses three or more levels of battery modules inside an opposing pair of sidewalls. Further, a holder case is closed off by an inlet panel on the inlet side and an outlet panel on the outlet side of the pair of opposing sidewalls. An enclosed chamber is formed by the pair of opposing sidewalls, the inlet panel, and the outlet panel, and battery modules are housed inside the enclosed chamber. An inlet panel has air intakes opened on both sides to pass cooling air inside the chamber. Cooling air introduced through the air intakes flows between the battery modules and the opposing sidewalls. An outlet panel has an exhaust opening at its central region to exhaust cooling air from inside the chamber to the outside. Cooling air that flows over battery module surfaces flows to the outside through the exhaust opening in the central region. Finally, opposing sidewalls have projections that protrude between adjacent battery modules, and the height of the interior surfaces of those projections increases from upstream to downstream in the cooling air flow.

The battery array described above has the characteristic that temperature differentials in the plurality of battery modules housed in the holder case can be reduced, and battery modules can be cooled uniformly. This is because the battery array of the present invention houses three or more levels of battery modules in a holder case that forms an enclosed chamber bounded by a pair of opposing sidewalls, an inlet panel on the inlet side, and an outlet panel at the outlet side. Cooling air intakes are opened on both sides of the inlet panel, and cooling air passes between battery modules and opposing sidewalls. An exhaust opening to the outside is opened in the central region of the outlet panel, and cooling air passes along battery module surfaces to be exhausted at the central region of the outlet panel. Further, projections that protrude between adjacent battery modules are provided in opposing sidewalls, and the height of the interior surfaces of those projections increases from upstream to downstream.

Since cooling air from air intakes opened on both sides of the inlet panel flows between battery modules and opposing sidewalls, excessive cooling of a battery module at the cooling air intake side compared to other battery modules can be prevented in a battery array of this configuration. Since cooling air that flows along the surface of a battery module is exhausted to the outside from an exhaust opening through the central region of the outlet panel, a battery module at the outlet side can be efficiently cooled. Further, since the height of projections provided between adjacent battery modules increases from upstream to downstream, cooling gaps established between battery modules and projections become narrower towards the downstream side, and cooling gap area increases towards the downstream side. Consequently, the flow rate of cooling air, which has acquired battery module heat and risen in temperature, increases towards the downstream side, the contact area between cooling air and battery module increases towards the downstream side, and the amount of heat transfer at the downstream side can be increased. In this manner, temperature differentials in a plurality of battery modules housed in three or more levels in a holder case of the battery array of the present invention can be reduced and all battery modules can be cooled uniformly.

In the battery array of the present invention, a first battery module, a second battery module, and a third battery module are arranged and housed in three levels in the direction of air flow through the enclosed chamber. The opposing sidewalls are provided with first projections between the first battery module and the second battery module, and second projections between the second battery module and the third battery module. The second projections can be made taller than the first projections.

In the battery array of the present invention, a first battery module, a second battery module, and a third battery module are arranged and housed in three levels in the direction of air flow through the enclosed chamber. The opposing sidewalls are not provided with projections between the first battery module and the second battery module, but can be provided with second projections between the second battery module and the third battery module.

In the battery array of the present invention, both surfaces of the second projections of the opposing sidewalls can be curved surfaces that conform to the surface of the opposing battery module.

In the battery array of the present invention, angled closed regions can be provided on inside surfaces of the boundary regions between the outlet panel and opposing sidewalls. Surfaces of the angled closed regions opposite the battery module can be shaped to follow the surface of the battery module, and cooling gaps can be provided between angled closed regions and the battery module.

In the battery array of the present invention, first cooling gaps are established between the first battery module and opposing sidewalls where the first battery module is in proximity with the inside surfaces of the opposing sidewalls. Second cooling gaps are established between the second battery module and the second projections where the second battery module is in proximity with the second projections. Angled closed regions are provided on inside surfaces of the boundary regions between the outlet panel and opposing sidewalls. Third cooling gaps are established between the third battery module, and the second projections and angled closed regions where the third battery module is in proximity with the second projections and angled closed regions. In this battery array, the second cooling gaps are narrow over half the perimeter of a battery module. The third cooling gaps extend over more area than the second cooling gaps and are narrow over the entire perimeter of a battery module.

The inner surfaces of the inlet panel of the battery array of the present invention can have inclined slopes from both sides towards the center.

The above and further objects and features of the invention will more fully be apparent from the following detailed description with accompanying drawings.

DETAILED DESCRIPTION OF THE PREFERRED EMBODIMENTS

Figure 1:
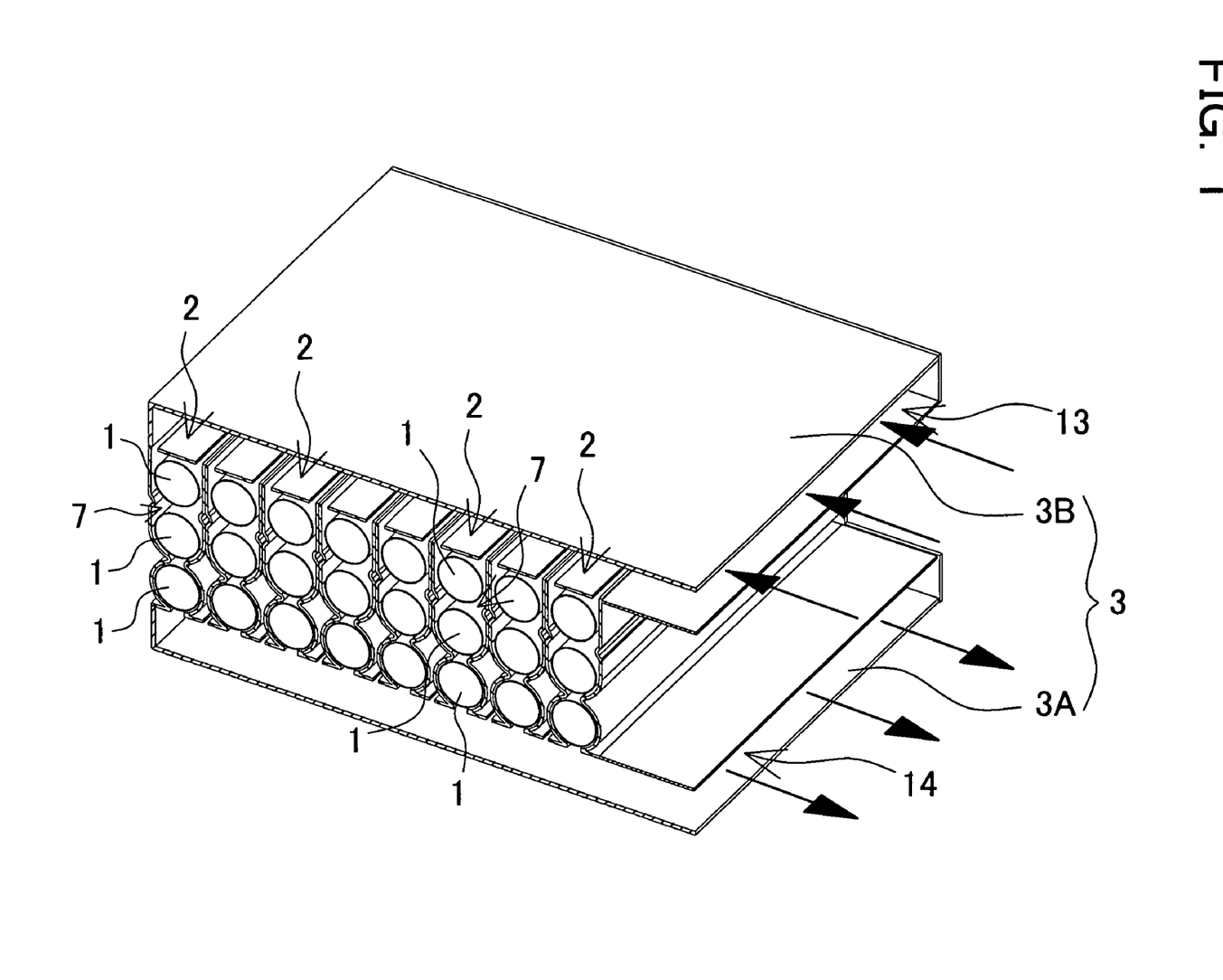
FIG. 1 is a perspective view in cross-section of a battery array of an embodiment of the present invention.

The battery array shown in FIG. 1 houses a plurality of holder cases 2 connected in a straight-line arrangement inside an outer case 3. Each holder case 2 houses a plurality of battery modules 1, and a battery module 1 is a series connection of a plurality of individual battery cells joined in a straight-line fashion. Each of the plurality of battery modules 1 housed in each holder case 2 are connected in series. However, holder case battery modules may also be connected in series and parallel.

The battery array of the figure is provided with an inlet air duct 13 between the outer case 3 and the holder cases 2 to supply cooling air to the holder cases 2. The battery array is also provided with an exhaust duct 14 to exhaust cooling air from inside the holder cases 2. In this battery array, cooling air flows from the inlet air duct 13, inside the holder cases 2, to the exhaust duct 14, and when the cooling air passes through the interior of the holder cases 2, it cools the battery modules 1.

The battery array of FIG. 1 is provided with an inlet air duct 13 above the holder cases 2 and an exhaust duct 14 below the holder cases 2. The battery array can also be configured in an inverted disposition relative to that of FIG. 1. An inverted battery array cools battery modules inside the holder cases by passing cooling air upward from below. Cooling air can flow smoothly through a holder case having an upward flow of cooling air from below.

As shown in FIG. 1, in a battery array housing a plurality of holder cases 2 arranged in an outer case 3, battery array output voltage can be adjusted by changing the number of holder cases 2 housed inside. Output voltage can be increased by increasing the number of holder cases 2 inside the outer case 3, which increases the number of series connected batteries. However, the battery array of the present invention does not necessarily require housing a plurality of holder cases inside an outer case. For example, as shown in FIG. 2, a single holder case 22 can be divided by partitions 215 into a plurality of enclosed chambers 27, and battery modules 21 can be housed in three levels or more in each enclosed chamber 27.

Figure 2:
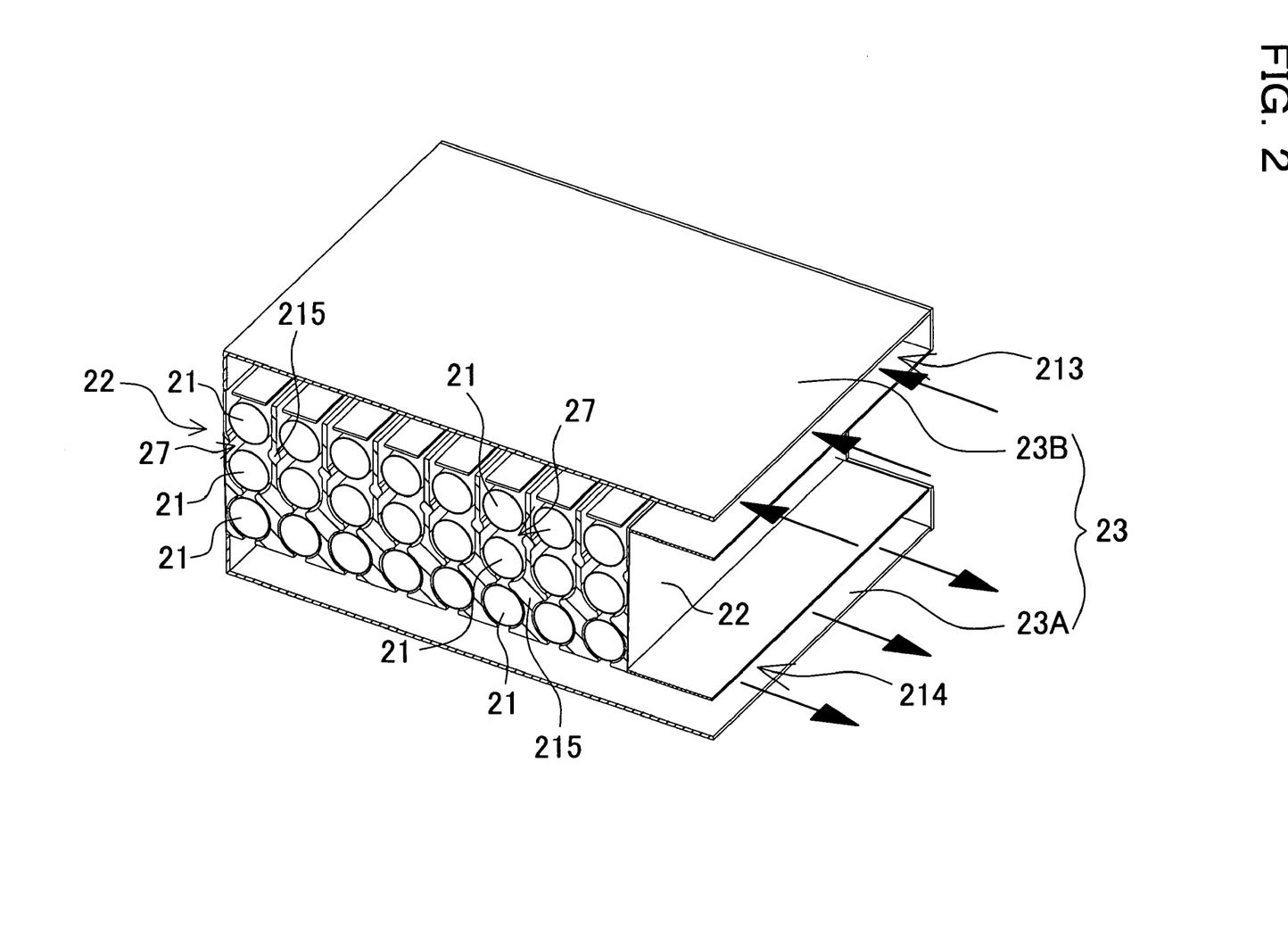
FIG. 2 is a perspective view in cross-section of a battery array of another embodiment of the present invention.

The outer case 3, 23 of the battery arrays of FIGS. 1 and 2 is provided with a bottom case 3A, 23A attached to the bottom surfaces of a plurality of holder cases 2 or to the bottom surface of a single holder case 22. The outer case 3, 23 is also provided with a top case 3B, 23B attached to the upper surfaces of a plurality of holder cases 2 or to the upper surface of a single holder case 22.

The bottom case 3A, 23A is the frame for attaching holder cases 2, 22. The bottom case 3A, 23A is provided with projections (not illustrated) along both sides, both ends of the holder cases 2, 22 are held fixed on those projections, and the exhaust duct 14, 214 is established by the stand-off between the holder cases 2, 22 and the bottom case 3A, 23A. The vertical width of the exhaust duct 14, 214 is adjusted by the height of the bottom case projections. Although not illustrated, the height of the projections can be made gradually taller in the direction of cooling air flow to widen the vertical dimension of the exhaust duct in the direction of cooling air flow.

The top case 3B, 23B is a cover over the upper surfaces of the holder cases 2, 22, and the inlet air duct 13, 213 is provided between the top case 3B, 23B and the holder cases 2, 22. Although not illustrated, the vertical distance between the top case and the holder cases of this battery array can be made gradually narrower in the direction of cooling air flow to narrow the vertical dimension of the inlet air duct in the direction of cooling air flow.

Although not illustrated, end-plates located at both ends of a battery module are fixed to the holder case. End-plates are formed from an insulating material such as plastic, and join bus-bars, which are attached to electrode terminals provided at both ends of a battery module, in fixed positions. Bus-bars are metal plates that connect adjacent battery modules in series. End-plates screw-fasten with bus-bars to attach to battery modules, and are held in fixed positions in the holder case.

Figure 3:
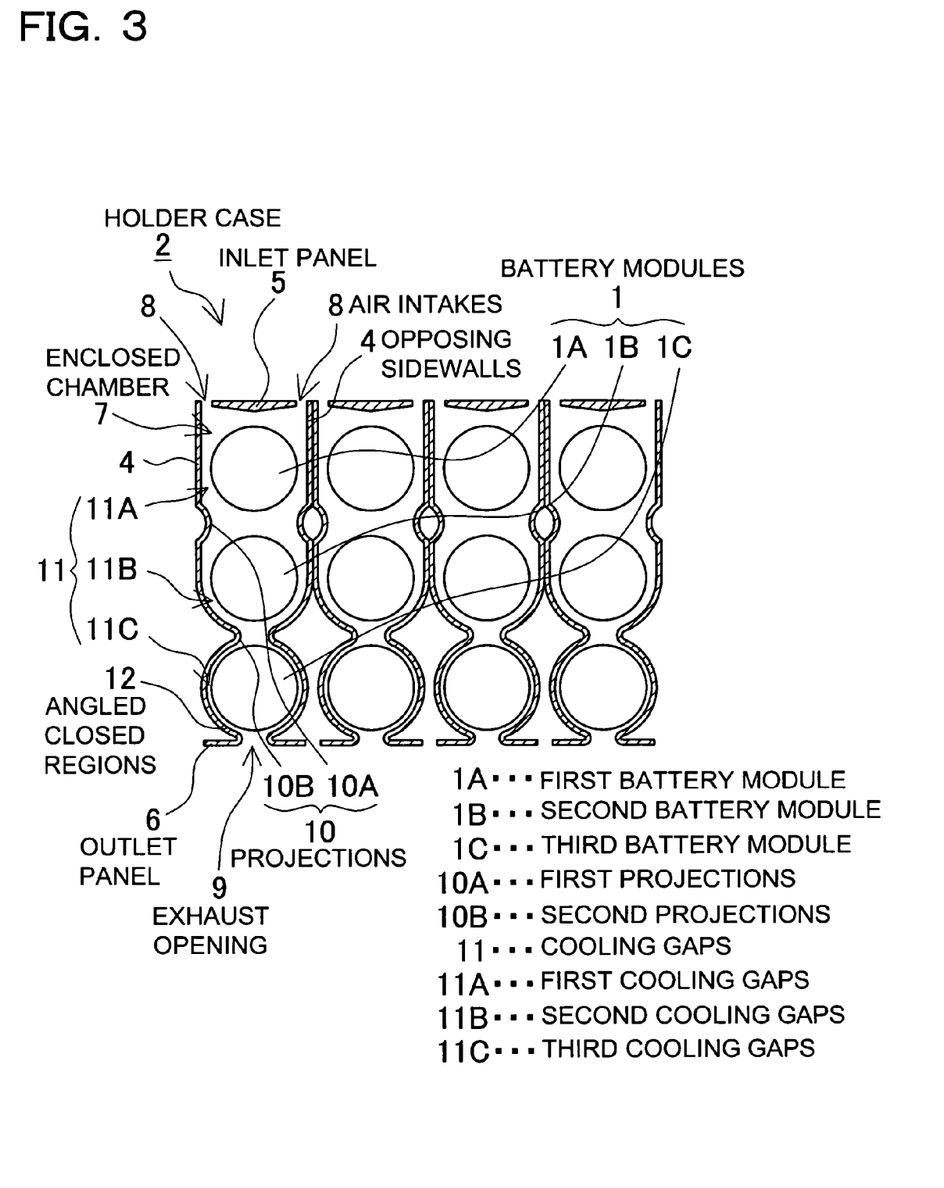
FIG. 3 is an enlarged cross-section view of holder cases of the battery array shown in FIG. 1.
Figure 6:
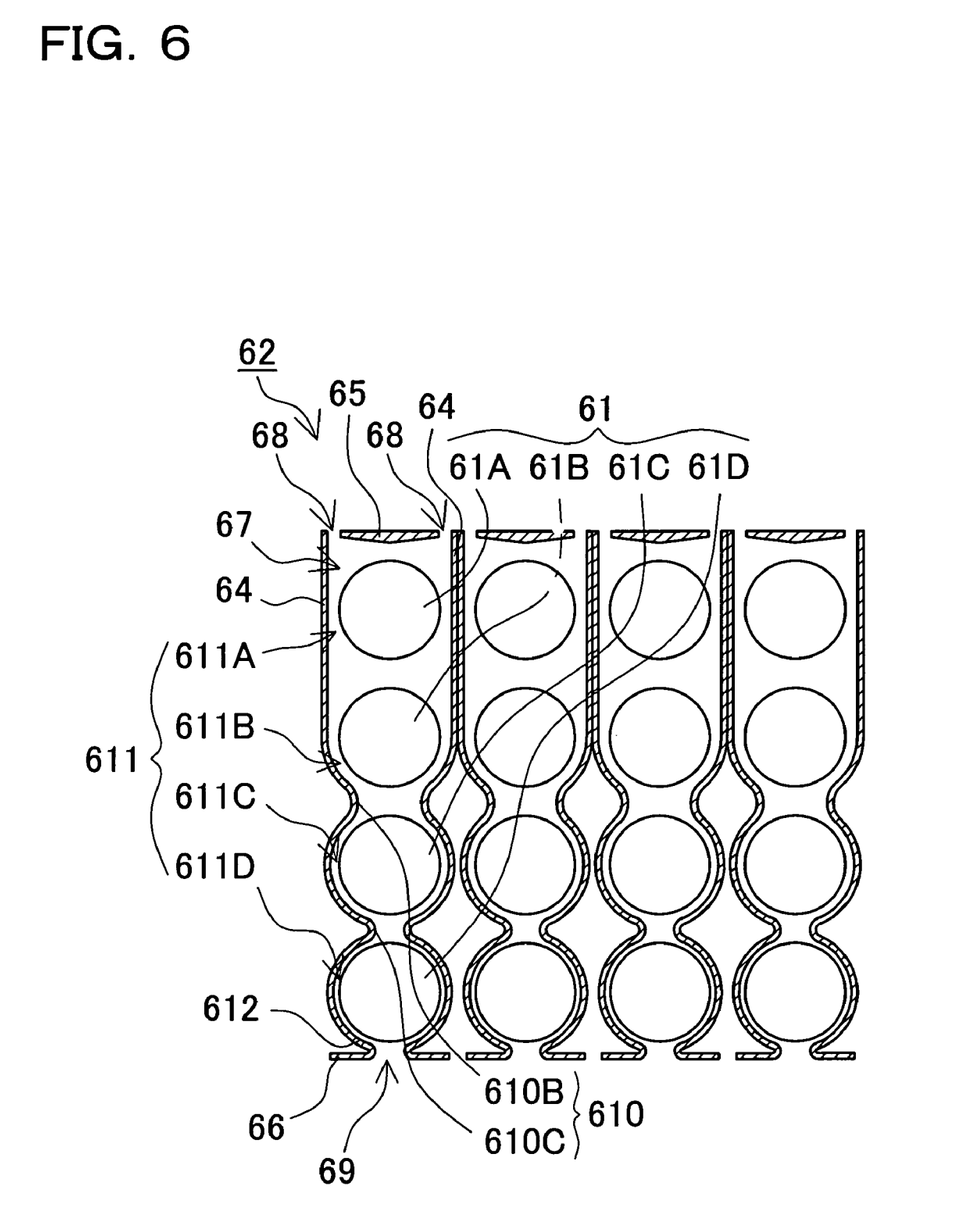
FIG. 6 is an enlarged cross-section view showing another example of holder cases.
Figure 7:
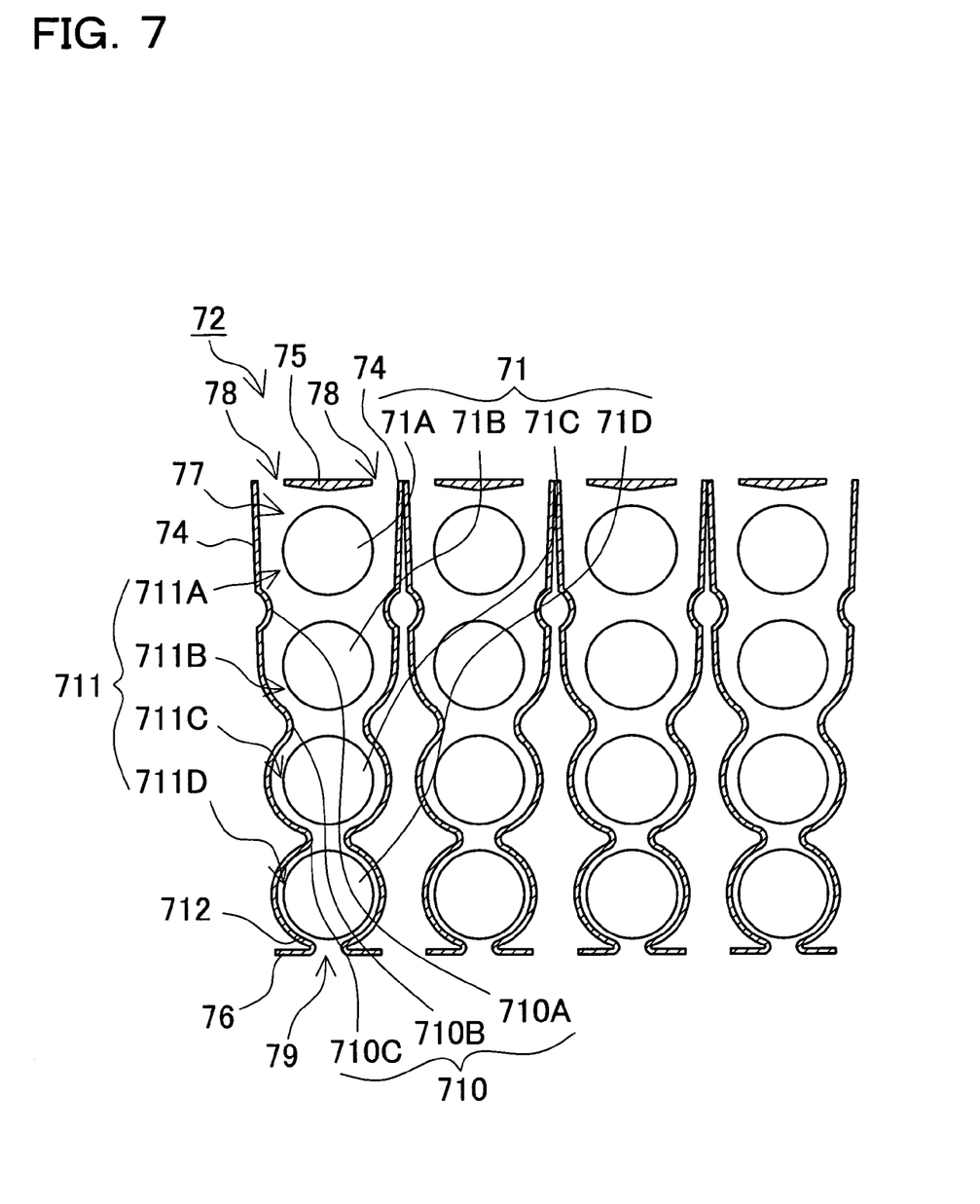
FIG. 7 is an enlarged cross-section view showing another example of holder cases.
Figure 8:
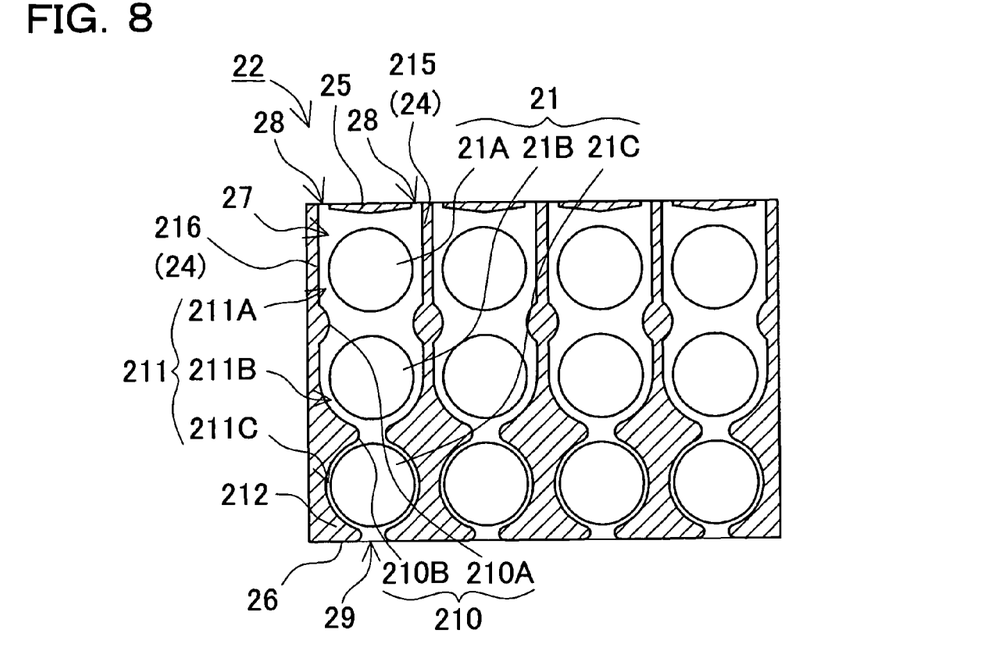
FIG. 8 is an enlarged cross-section view of the holder case of the battery array shown in FIG. 2.

As shown in FIGS. 3-9, a holder case houses three levels or more of battery modules in the direction of cooling air flow (from top to bottom in the figures) in parallel disposition. Here, FIG. 3 shows holder cases 2 of the battery array shown in FIG. 1, and FIG. 8 shows the holder case 22 of the battery array shown in FIG. 2. FIGS. 4-7 and 9 show holder cases of other embodiments. In the embodiments shown in FIGS. 4-9, structural elements that are the same as the embodiment of FIG. 3 are given the same alphanumeric label as in FIG. 3 except for the left-most digit, and their detailed description is abbreviated.

A battery module 1, 21, 41, 51, 61, 71, 91 has a plurality of individual battery cells connected in series and joined in a straight-line fashion. For example, a battery module 1, 21, 41, 51, 61, 71, 91 has five or six individual battery cells connected in series and joined in a straight-line fashion. However, a battery module can also connect four or less, or seven or more individual battery cells. Individual battery cells are nickel hydrogen battery cells. However, individual battery cells can also be other rechargeable batteries such as lithium ion rechargeable batteries or nickel cadmium batteries. The battery modules 1, 21, 41, 51, 61, 71, 91 of the figures have circular cylindrical shapes and join circular cylindrical batteries in a straight-line fashion.

A holder case 2, 42, 52, 62, 72 as shown in FIGS. 3-7 has three levels or more of battery modules 1, 41, 51, 61, 71 housed inside a pair of opposing sidewalls 4, 44, 54, 64, 74. The pair of opposing sidewalls 4, 44, 54, 64, 74 is closed off by an inlet panel 5, 45, 55, 65, 75 on the inlet side and an outlet panel 6, 46, 56, 66, 76 on the outlet side of the pair of opposing sidewalls 4, 44, 54, 64, 74. An enclosed chamber 7, 47, 57, 67, 77 is formed by the pair of opposing sidewalls 4, 44, 54, 64, 74, the inlet panel 5, 45, 55, 65, 75, and the outlet panel 6, 46, 56, 66, 76, and battery modules 1, 41, 51, 61, 71, are housed inside the enclosed chamber 7, 47, 57, 67, 77.

Figure 9:
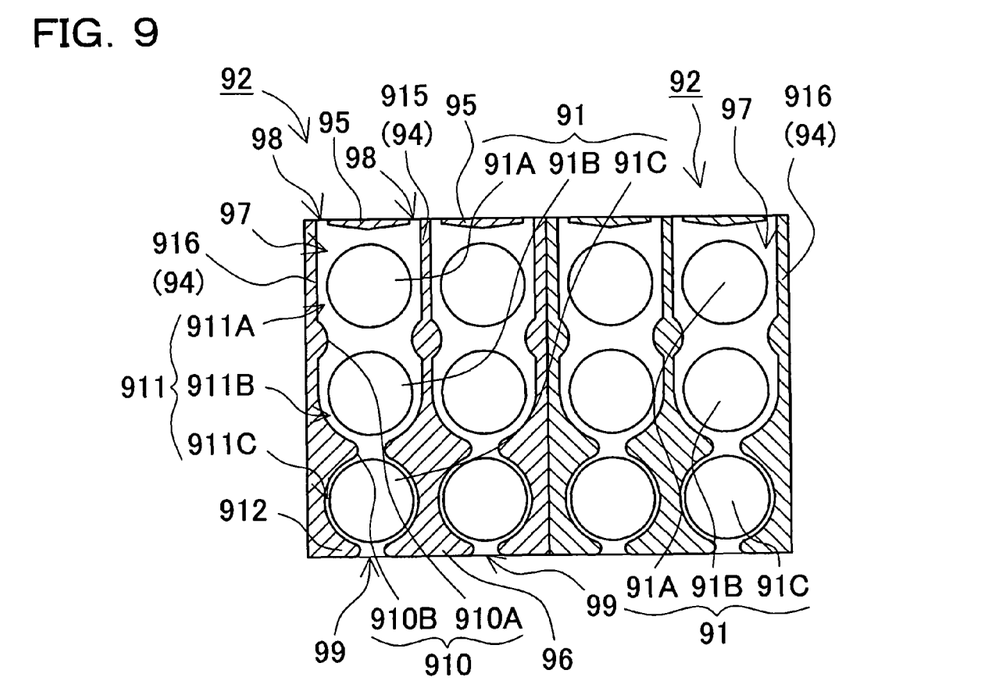
FIG. 9 is an enlarged cross-section view showing another example of a holder case.

A holder case 22, 92 as shown in FIGS. 8 and 9 has its interior divided into a plurality of enclosed chambers 27, 97 by partitions 215, 915, and three levels of battery modules 21, 91 are housed in each enclosed chamber 27, 97. As shown in FIG. 2, the holder case 22 of FIG. 8 is a single holder case 22 with its interior divided into a plurality of enclosed chambers 27 by partitions 215. A holder case 92 as shown in FIG. 9 has its interior divided into two enclosed chambers 97 by partitions 915, and a plurality of those holder cases 92 are joined in a straight-line fashion. In these holder cases 22, 92, sidewalls 216, 916 and partitions 215, 915 act as opposing sidewalls 24, 94, and a pair of opposing sidewalls 24, 94, an inlet panel 25, 95 on the inlet side, and an outlet panel 26, 96 on the outlet side close off to form an enclosed chamber 27, 97.

Figure 4:
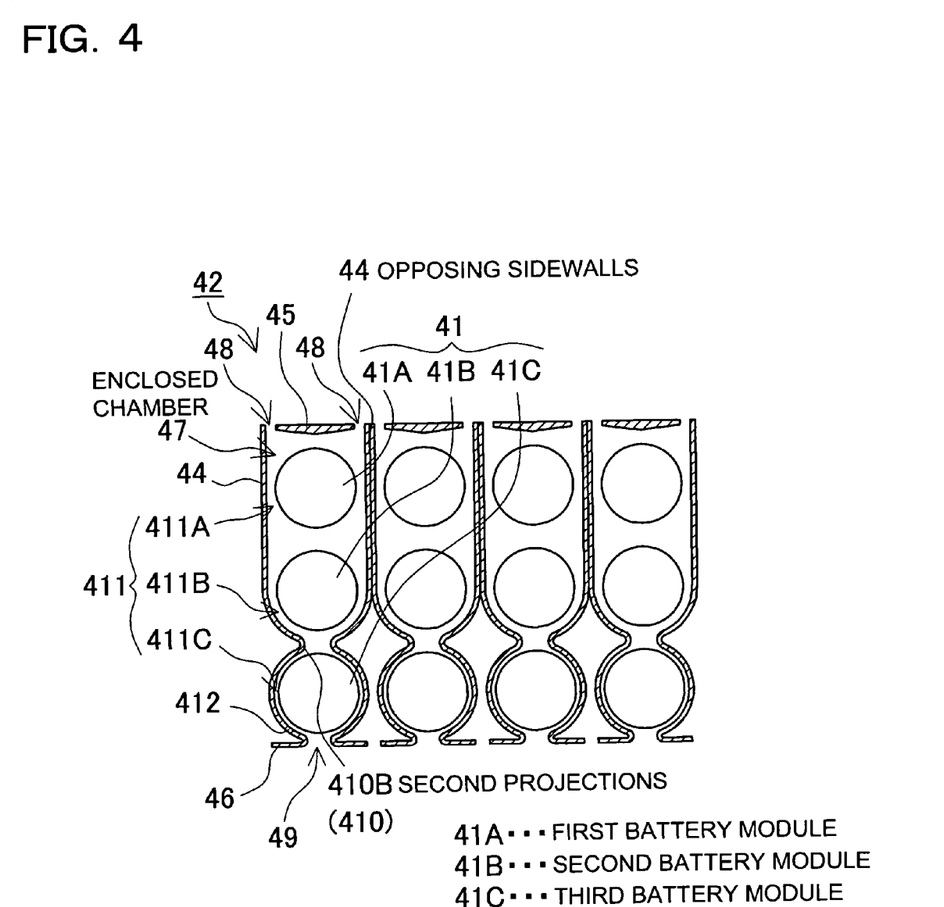
FIG. 4 is an enlarged cross-section view showing another example of holder cases.
Figure 5:
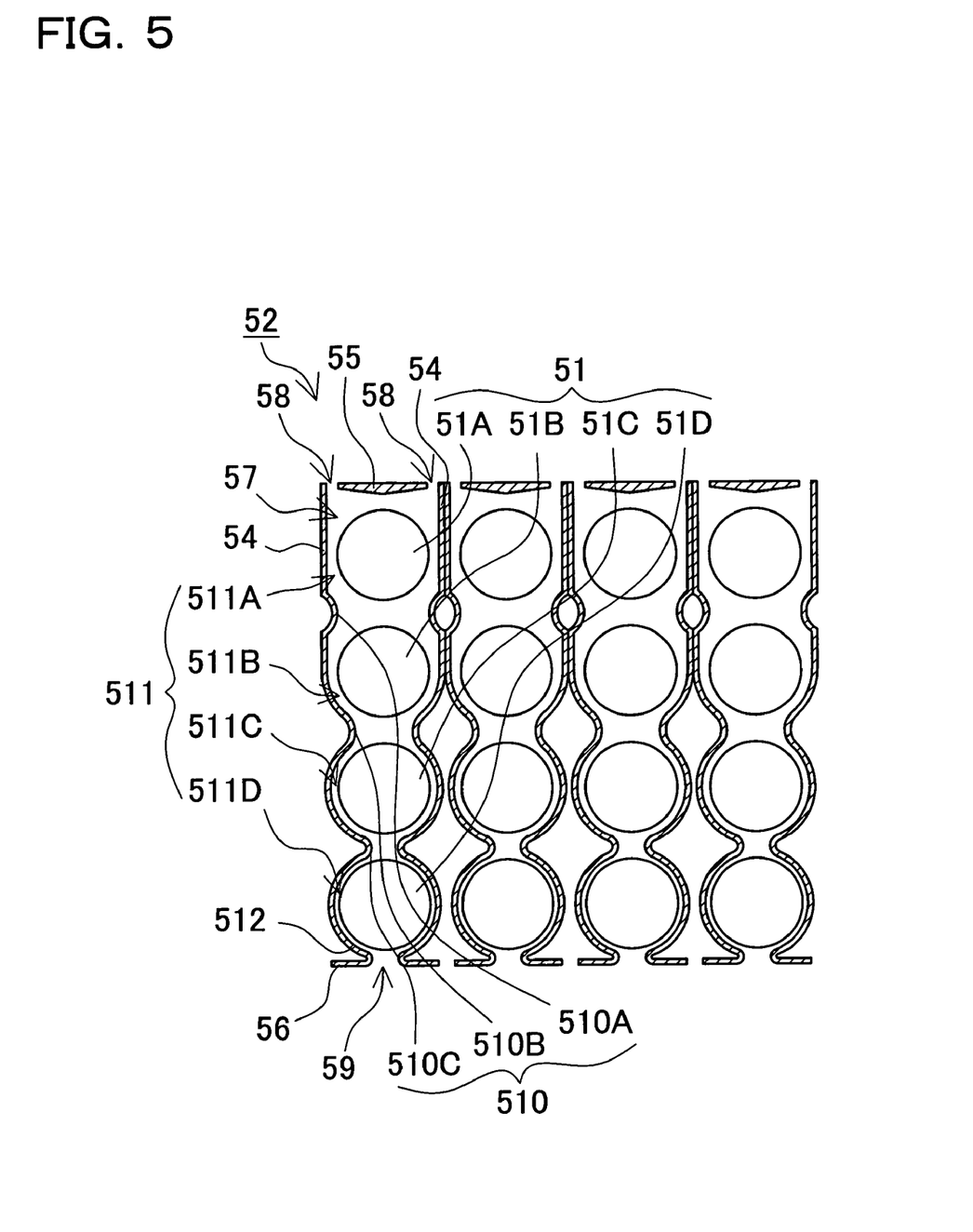
FIG. 5 is an enlarged cross-section view showing another example of holder cases.

A holder case 2, 42, 22, 92 as shown in FIGS. 3, 4, and 8 houses battery modules 1, 41, 21, 91 in three levels and in one column between a pair of opposing sidewalls 4, 44, 24, 94. This holder case 2, 42, 22, 92 houses a first battery module 1A, 41A, 21A, 91A, a second battery module 1B, 41B, 21B, 91B, and a third battery module 1C, 41C, 21C, 91C arranged in three levels in the direction of cooling air flow (from top to bottom in the figures). A holder case 52, 62, 72 as shown in FIGS. 5-7 houses four levels of battery modules 51, 61, 71. This holder case 52, 62, 72 houses a first battery module 51A, 61A, 71A, a second battery module 51B, 61B, 71B, a third battery module 51C, 61C, 71C, and a fourth battery module 51D, 61D, 71D arranged in four levels in the direction of cooling air flow.

A holder case 2, 22, 42, 52, 62, 72, 92 as shown in these figures has air intakes 8, 28, 48, 58, 68, 78, 98 and an exhaust opening 9, 29, 49, 59, 69, 79, 99 to pass cooling air over the battery modules 1, 21, 41, 51, 61, 71, 91 housed inside. Cooling air that enters a holder case 2, 22, 42, 52, 62, 72, 92 from the air intakes 8, 28, 48, 58, 68, 78, 98 cools the battery modules 1, 21, 41, 51, 61, 71, 91 and is exhausted out the exhaust opening 9, 29, 49, 59, 69, 79, 99.

In a holder case 2, 22, 42, 52, 62, 72, 92 of the figures, the air intakes 8, 28, 48, 58, 68, 78, 98 are opened through the inlet panel 5, 25, 45, 55, 65, 75, 95, and the exhaust opening 9, 29, 49, 59, 69, 79, 99 is opened through the outlet panel 6, 26, 46, 56, 66, 76, 96. The air intakes 8, 28, 48, 58, 68, 78, 98 are opened through both sides of the inlet panel 5, 25, 45, 55, 65, 75, 95, and cooling air introduced through the air intakes 8, 28, 48, 58, 68, 78, 98 passes between the first battery module 1A, 21A, 41A, 51A, 61A, 71A, 91A and opposing sidewalls 4, 24, 44, 54, 64, 74, 94. In the figures, air intakes 8, 28, 48, 58, 68, 78, 98 are opened through the inlet panel 5, 25, 45, 55, 65, 75, 95 directly over the inner surfaces of the opposing sidewalls 4, 24, 44, 54, 64, 74, 94. These air intakes 8, 28, 48, 58, 68, 78, 98 introduce cooling air that flows along the inner surfaces of the opposing sidewalls 4, 24, 44, 54, 64, 74, 94 and passes between the first battery module 1A, 21A, 41A, 51A, 61A, 71A, 91A and the opposing sidewalls 4, 24, 44, 54, 64, 74, 94.

Although air intakes 8, 28, 48, 58, 68, 78, 98 are opened through both sides of an inlet panel 5, 25, 45, 55, 65, 75, 95, they are not necessarily limited to positions directly over the inner surfaces of opposing sidewalls 4, 24, 44, 54, 64, 74, 94, as shown in the figures. For example, air intakes may be opened at locations somewhat towards the center of the inlet panel rather than directly over the inner surfaces of the opposing sidewalls. However, if an air intake is opened through the center of the inlet panel, it develops the drawback that cooling air over-cools the first battery module relative to other battery modules. Although the amount of heat transfer is increased in first cooling gaps 11A, 211A, 411A, 511A, 611A, 711A, 911A established where the first battery module 1A, 21A, 41A, 51A, 61A, 71A, 91A is in proximity with opposing sidewalls 4, 24, 44, 54, 64, 74, 94 on both sides, the amount of heat transfer is not increased in other regions. Cooling air flowing past the first battery module 1A, 21A, 41A, 51A, 61A, 71A, 91A has a lower temperature than cooling air flowing past other battery modules, and can efficiently cool the first battery module 1A, 21A, 41A, 51A, 61A, 71A, 91A via cooling gaps with limited contact area for heat transfer.

If an air intake were opened through the center of an inlet panel, cooling air introduced into the holder case from the air intake would flow along the surface of the upper half of the first battery module of the figures to cool that battery module. In the present invention, the upper surface of the first battery module 1A, 21A, 41A, 51A, 61A, 71A, 91A is not cooled by cooling air flow, but rather is only cooled by cooling gaps 11A, 211A, 411A, 511A, 611A, 711A, 911A formed on both sides where the first battery module 1A, 21A, 41A, 51A, 61A, 71A, 91A is in proximity with opposing sidewalls 4, 24, 44, 54, 64, 74, 94. This balances first battery module 1A, 21A, 41A, 51A, 61A, 71A, 91A cooling with other battery modules for uniform cooling. To realize this, the air intakes 8, 28, 48, 58, 68, 78, 98 are not opened through the center of the inlet panel 5, 25, 45, 55, 65, 75, 95. Even if air intakes 8, 28, 48, 58, 68, 78, 98 are adjusted from directly over inner surfaces of opposing sidewalls 4, 24, 44, 54, 64, 74, 94, they are opened at locations outward of points midway between directly above the inner surfaces of opposing sidewalls 4, 24, 44, 54, 64, 74, 94 and the center of the inlet panel 5, 25, 45, 55, 65, 75, 95.

The inner surfaces of the inlet panel 5, 25, 45, 55, 65, 75, 95 shown in the figures have inclined slopes from both sides towards the center. Since the inlet panel 5, 25, 45, 55, 65, 75, 95 of the figures is provided at the top of a holder case 2, 22, 42, 52, 62, 72, 92, the inner surfaces of the inlet panel 5, 25, 45, 55, 65, 75, 95, which are the bottom surfaces, are configured to slope downward from both sides towards the center. When battery modules 1, 21, 41, 51, 61, 71, 91 are radiating heat in a natural fashion, air heated by that radiation forms convective updrafts that follow the inclined surfaces of the inlet panel 5, 25, 45, 55, 65, 75, 95 from the center towards both sides. Since the heated air smoothly exhausts through the air intakes 8, 28, 48, 58, 68, 78, 98 on both sides, this configuration has the characteristic that heat convection can be prevented inside an enclosed chamber 7, 27, 47, 57, 67, 77, 97.

Opposite the air intakes 8, 28, 48, 58, 68, 78, 98, an exhaust opening 9, 29, 49, 59, 69, 79, 99 is opened at the center of the outlet panel 6, 26 46, 56, 66, 76, 96. In a holder case 2, 42, 22, 92 of FIGS. 3, 4, 8, and 9, cooling air exhausted from the enclosed chamber 7, 47, 27, 97 flows along the bottom surface of the third battery module 1C, 41C, 21C, 91C to efficiently cool the third battery module 1C, 41C, 21C, 91C. In a holder case 52, 62, 72 of FIGS. 5-7, cooling air exhausted from the enclosed chamber 57, 67, 77 flows along the bottom surface of the fourth battery module 51D, 61D, 71D to efficiently cool the fourth battery module 51D, 61D, 71D. An exhaust opening 9, 29, 49, 59, 69, 79, 99 opened at the center of the outlet panel 6, 29, 46, 56, 66, 76, 96 collects cooling air that flows along the bottom half of both sides of the third battery module 1C, 41C, 21C, 91C or the fourth battery module 51D, 61D, 71D and exhausts it at the center of the outlet panel 6, 29, 46, 56, 66, 76, 96.

A holder case 2, 22, 42, 52, 62, 72, 92 of the figures is also provided with projections 10, 210, 410, 510, 610, 710, 910 on inner surfaces of opposing sidewalls 4, 24, 44, 54, 64, 74, 94 to control ventilating flow conditions in cooling gaps 11, 211, 411, 511, 611, 711, 911 established between each level of battery modules 1, 21, 41, 51, 61, 71, 91 and opposing sidewalls 4, 24, 44, 54, 64, 74, 94. Projections 10, 210, 410, 510, 610, 710, 910 are provided between adjacent battery modules 1, 21, 41, 51, 61, 71, 91. The height of the projections 10, 210, 410, 510, 610, 710, 910 protruding from an inner surface increases from upstream to downstream in the cooling air flow. The area that cooling gaps 11, 211, 411, 511, 611, 711, 911 extend over downstream battery modules 1, 21, 41, 51, 61, 71, 91, that is the contact area for cooling air with downstream battery modules 1, 21, 41, 51, 61, 71, 91 is greater than upstream. In addition, the width of downstream cooling gaps 11, 211, 411, 511, 611, 711, 911 is narrower than upstream.

The amount of heat transfer afforded by cooling air flowing over a battery module varies depending on the temperature difference between the cooling air and the battery module, the flow rate of the cooling air, and the area of contact between the cooling air and the battery module. When there is little temperature difference between the cooling air and the battery module, the amount of heat transfer becomes small. Therefore, when the temperature of the cooling air becomes high and the temperature difference relative to the battery module becomes small, the amount of heat transfer becomes small. The temperature of the cooling air rises downstream as battery module heat is transferred to the cooling air. Consequently, the amount of heat transfer from downstream battery modules to the heated cooling air decreases.

The amount of heat transfer can be increased by increasing the flow rate of the cooling air and by increasing the contact area with the cooling air. The height of the projections 10, 210, 410, 510, 610, 710, 910 sets the flow rate and contact area of the cooling air with battery module 1, 21, 41, 51, 61, 71, 91 surfaces. If the height of the projections is increased, the projections become closer to battery module surfaces, and cooling gaps established between projections and battery modules become narrower. In addition, tall projections also increase the area of cooling gaps established between projections and battery modules. Therefore, projections 10, 210, 410, 510, 610, 710, 910 compensate for reduced heat transfer due to gradual temperature increase in the cooling air, and result in uniform cooling of all battery modules 1, 21, 41, 51, 61, 71, 91.

Opposing sidewalls 4, 24, 94 of a holder case 2, 22, 92 of FIGS. 3, 8, and 9 are provided with first projections 10A, 210A, 910A between the first battery module 1A, 21A, 91A and the second battery module 1B, 21B, 91B, and with second projections 10B, 210B, 910B between the second battery module 1B, 21B, 91B and the third battery module 1C, 21C, 91C. The second projections 10B, 210B, 910B are taller than the first projections 10A, 210A, 910A, and the second projections 10B, 210B, 910B are closer to the surfaces of the battery modules 1, 21, 91 than the first projections 10A, 210A, 910A.

In the opposing sidewalls 4, 44, 24, 94 of FIGS. 3, 4, 8, and 9, the surfaces of the second projections 10B, 410B, 210B, 910B on both sides are made as curved surfaces conforming to the surfaces of opposing battery modules 1, 41, 21, 91. These projections 10, 410, 210, 910 establish uniform cooling gaps 11, 411, 211, 911 between the projections 10, 410, 210, 910 and battery modules 1, 41, 21, 91, and allow cooling air to flow smoothly. A holder case 2, 42, 22, 92 of the figures is also provided with angled closed regions 12, 412, 212, 912 on inside surfaces of the boundary regions between the outlet panel 6, 46, 26, 96 and opposing sidewalls 4, 44, 24, 94. Surfaces of the angled closed regions 12, 412, 212, 912 opposite battery module 1, 41, 21, 91 surfaces have shapes that follow the battery module 1, 41, 21, 91 surfaces. In this manner, a holder case 2, 42, 22, 92, provided with angled closed regions 12, 412, 212, 912 at the outlet side, can pass cooling air along the surfaces of battery modules 1, 41, 21, 91, collect cooling air at the exhaust opening 9, 49, 29, 99, and exhaust it to the outside. Consequently, the third battery module 1C, 41C, 21C, 91C can be efficiently cooled and decreased heat transfer due to cooling air temperature rise can be compensated to reduce battery module 1, 41, 21, 91 temperature differentials.

In the holder case 2, 42, 22, 92 described above, first cooling gaps 11A, 411A, 211A, 911A are established only at both side regions of the first battery module 1A, 41A, 21A, 91A, second cooling gaps 11B, 411B, 211B, 911B are established along the downstream half of the second battery module 1B, 41B, 21B, 91B, and third cooling gaps 11C, 411C, 211C, 911C are established along the surfaces of both the upstream half and the downstream half of the third battery module 1C, 41C, 21C, 91C. Consequently, the contact area of cooling gaps 11, 411, 211, 911 for cooling air flow along the surfaces of battery modules 1, 41, 21, 91 increases from the first cooling gaps 11A, 411A, 211A, 911A to the third cooling gaps 11C, 411C, 211C, 911C.

In a holder case shown in FIGS. 3, 8, and 9, by making the second projections 10B, 210B, 910B taller than the first projections 10A, 210A, 910A, the third cooling gaps 11C, 211C, 911C are made narrower than the second cooling gaps 11B, 211B, 911B. Consequently, the flow rate of cooling air flowing along the surfaces of the third battery module 1C, 21C, 91C is greater than that flowing along the surfaces of the second battery module 1B, 21B, 91B.

As shown in FIG. 4, it is not always necessary to provide first projections between the first battery module 41A and the second battery module 41B of a battery array housing three levels of battery modules in a holder case. This is because cooling gaps 411B can be established by the second projections 410B to cool the downstream half of the second battery module 41B. The second cooling gaps 411B have more contact area, and are narrower than the first cooling gaps 411A established at both sides of the first battery module 41A. In addition, the second cooling gaps 411B have less contact area, and are wider than the third cooling gaps 411C. This allows the first battery module 41A, the second battery module 41B, and the third battery module 41C to be cooled uniformly.

A battery array can also house four or more levels of battery modules in a holder case. The battery array of FIG. 5 has a first battery module 51A, a second battery module 51B, a third battery module 51C, and a fourth battery module 51D disposed in four levels in the direction of cooling air flow in a holder case 52. This battery array is provided with first projections 510A between the first battery module 51A and the second battery module 51B, second projections 510B between the second battery module 51B and the third battery module 51C, third projections 510C between the third battery module 51C and the fourth battery module 51D, and angled closed regions 512 at the outlet end. In this battery array, projection height increases from the first projections 510A towards the third projections 510C for uniform battery module cooling. Specifically, by increasing holder case projection height from the first projections 510A towards the third projections 510C, the second cooling gaps 511B are made narrower than the first cooling gaps 511A, the third cooling gaps 511C are made narrower than the second cooling gaps 511B, and the fourth cooling gaps 511D are made narrower than the third cooling gaps 511C. Consequently, the flow rate of cooling air flowing along battery module surfaces increases from the first battery module 51A towards the fourth battery module 51D. Further, as shown in FIG. 6, this battery array can also have a configuration that does not provide first projections between the first battery module 61A and the second battery module 61B.

Finally, as shown in FIG. 7, a battery array can also have opposing sidewalls 74 that become closer together downstream. This increases the amount of heat transfer of cooling air with downstream battery modules resulting in more uniform heat transfer with all battery modules 71.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. This application is based on Application No. 2005-252746 filed in Japan on Aug. 31, 2005, the content of which is incorporated hereinto by reference.

What is claimed is:

1. A battery array comprising:
   a holder case including a pair of opposed sidewalls, an inlet panel disposed at a first end of the opposed sidewalls, and an outlet panel disposed at a second end of the opposed sidewalls, wherein the opposed sidewalls, the inlet panel and the outlet panel form an enclosed chamber; and at least three battery modules disposed in the enclosed chamber of the holder case so as to be stacked in at least three levels in a direction of cooling air flow through the enclosed chamber and across the battery modules, each of the battery modules comprising a plurality of individual battery cells connected in a straight-line manner, wherein:

the battery modules includes a first battery module, a second battery module and a third battery module disposed in order from the inlet panel toward the outlet panel, the inlet panel has air intakes located on both sides to introduce cooling air into the enclosed chamber so that cooling air introduced from the air intakes flows between the battery modules and the opposed sidewalls;

the outlet panel has an exhaust opening opened at a center region thereof to exhaust cooling air from the enclosed chamber to the outside of the holder case so that cooling air that flows along battery module surfaces is expelled to the outside of the holder case from the center region; and a region of the opposed sidewalls opposing the first battery module is formed in a planar shape, a region of the opposed sidewalls opposing the second battery module is formed in a planar shape at an inlet panel side and formed in a curved shape that conforms to a surface of the second battery module at an outlet panel side, and a region of the opposed sidewalls opposing the third battery module is formed in a curved shape that conforms to a surface of the third battery module, first cooling gaps are formed between the first battery module and the opposed sidewalls where the first battery module is close to inner surfaces of the opposed sidewalls;

second cooling gaps are formed between the second battery module and the opposed sidewalls opposing the second battery module;

third cooling gaps are formed between the third battery module and opposed sidewalls opposing the third battery module; and the conformal area, where the opposed sidewalls conform to the contour of the second battery module, of the second cooling gaps is less than half a battery module perimeter, and the third cooling gaps are narrower than the second cooling gaps at the conformal areas.

2. The battery array as recited in claim 1, wherein the first battery module, the second battery module, and the third battery module are stacked in three levels in the direction of cooling air flow and housed in the enclosed chamber.

3. The battery array as recited in claim 1, wherein the opposed sidewalls are provided with first projections between the first battery module and the second battery module, second projections between the second battery module and the third battery module, and the second projections are taller than the first projections.

4. The battery array as recited in claim 3, wherein the second projections have curved surfaces that conform to the opposing battery module surfaces of the second and third battery modules.

5. The battery array as recited in claim 2, wherein the opposed sidewalls between the first battery module and the second battery module are planar, and projections are provided between the second battery module and the third battery module.

6. The battery array as recited in claim 5, wherein the projections have curved surfaces that conform to opposing battery module surfaces of the second and third battery modules.

7. The battery array as recited in claim 1, wherein angled closed regions are provided at inner surfaces of a boundary region of the outlet panel and the opposed sidewalls, surfaces of the angled closed regions are shaped to conform to opposing battery module surfaces, and cooling gaps are formed between the angled closed regions and the opposing battery module surfaces.

8. A battery array comprising:

a holder case including a pair of opposed sidewalls, an inlet panel disposed at a first end of the opposed sidewalls, and an outlet panel disposed at a second end of the opposed sidewalls, wherein the opposed sidewalls, the inlet panel and the outlet panel form an enclosed chamber; and at least three battery modules disposed in the enclosed chamber of the holder case so as to be stacked in at least three levels in a direction of cooling air flow through the enclosed chamber and across the battery modules, each of the battery modules comprising a plurality of individual battery cells connected in a straight-line manner, wherein:

the battery modules includes a first battery module, a second battery module and a third battery module disposed in order from the inlet panel toward the outlet panel, the inlet panel has air intakes located on both sides to introduce cooling air into the enclosed chamber so that cooling air introduced from the air intakes flows between the battery modules and the opposed sidewalls;

the outlet panel has an exhaust opening opened at a center region thereof to exhaust cooling air from the enclosed chamber to the outside of the holder case so that cooling air that flows along battery module surfaces is expelled to the outside of the holder case from the center region;

a region of the opposed sidewalls opposing the first battery module is formed in a planar shape, a region of the opposed sidewalls opposing the second battery module is formed in a planar shape at an inlet panel side and formed in a curved shape that conforms to a surface of the second battery module at an outlet panel side, and a region of the opposed sidewalls opposing the third battery module is formed in a curved shape that conforms to a surface of the third battery module;

the first battery module, the second battery module, and the third battery module are stacked in three levels in the direction of cooling air flow and housed in the enclosed chamber;

first cooling gaps are formed between the first battery module and the opposed sidewalls where the first battery module is close to inner surfaces of the opposed sidewalls;

second cooling gaps are formed between the second battery module and the second projections where the second battery module is close to the second projections;

angled closed regions are provided at inner surfaces of a boundary region of the outlet panel and the opposed sidewalls, and third cooling gaps are formed between the third battery module and the second projections and the angled closed regions where the third battery module is close to the second projections and the angled closed regions;

and the conformal area, where the opposed sidewalls conform to the contour of the second battery module, of the second cooling gaps is less than half a battery module perimeter, the width of the third cooling gaps is narrower than the width of the second cooling gaps at the conformal areas, and the conformal area of the third cooling gaps is less than a full battery module perimeter.

9. The battery array as recited in claim 1, wherein inner surfaces of the inlet panel have inclined surfaces that slope from both sides towards a center of the inlet panel.

10. The battery array as recited in claim 1, further comprising an outer case, wherein the holder case is housed in the outer case, an inlet air duct is provided between the outer case and the holder case to supply cooling air to the holder case, and an exhaust duct is provided between the outer case and the holder case to exhaust cooling air from inside the holder case.

11. The battery array as recited in claim 10, wherein the outer case is provided with a bottom case for attaching the holder case and a top case for attaching an upper surface of the holder case.

12. The battery array as recited in claim 11, wherein the bottom case is a frame for attaching holder cases.

13. The battery array as recited in claim 10, wherein a plurality of holder cases are joined in a straight-line manner and housed in the outer case.

14. The battery array as recited in claim 1, wherein a single holder case is divided into a plurality of enclosed chambers by partitions, and at least three battery modules are housed in at least three levels in each of the enclosed chambers.

15. The battery array as recited in claim 1, wherein the first battery module, the second battery module, the third battery module, and a fourth battery module are stacked in four levels in the direction of cooling air flow and are housed in the holder case.

16. The battery array as recited in claim 15, wherein first projections are provided between the first battery module and the second battery module, second projections are provided between the second battery module and the third battery module, third projections are provided between the third battery module and the fourth battery module, angled closed regions are provided at an outlet side of the enclosed chamber, and projection height of the projections increases from the first projections to the third projections.

17. The battery array as recited in claim 1, wherein opposing regions of the opposed sidewalls are planar shaped, and the planar shaped regions of the opposed sidewalls are inclined such that the distance between the planar shaped regions becomes smaller in a direction from the inlet panel toward the outlet panel.

18. The battery array as recited in claim 1, wherein the cooling gaps between the third battery module and the adjacent curved surfaces of the opposed sidewalls are narrower than the cooling gaps between the second battery module and the adjacent curved surfaces of the opposed sidewalls.

19. A battery array comprising:
a first holder case including a first pair of opposed sidewalls, an inlet panel disposed at a first end of the opposed sidewalls, and an outlet panel disposed at a second end of the opposed sidewalls, wherein the opposed sidewalls, the inlet panel and the outlet panel form a first enclosed chamber;
a second holder case including a second pair of opposed sidewalls, an inlet panel disposed at a first end of the opposed sidewalls, and an outlet panel disposed at a second end of the opposed sidewalls, wherein the second pair of opposed sidewalls, the inlet panel and the outlet panel form a second enclosed chamber; and
at least three battery modules disposed in each of the enclosed chambers of the first and second holder cases so as to be stacked in at least three levels in a direction of cooling air flow through the enclosed chamber and across the battery modules, each of the battery modules comprising a plurality of individual battery cells connected in a straight-line manner, wherein:
each of the inlet panels has air intakes located on both sides to introduce cooling air into the respective enclosed chamber so that cooling air introduced from the air intakes flows between the battery modules and the opposed sidewalls;
each of the outlet panels has an exhaust opening opened at a center region thereof to exhaust cooling air from the respective enclosed chamber so that cooling air that flows along battery module surfaces is expelled to the outside of the respective holder case from the center region;
the opposed sidewalls of the first and second pairs of opposed sidewalls define projections that project between adjacently disposed battery modules, and a height of the protrusions increases in a direction of cooling air flow;
the opposed sidewalls of the first and second pairs of opposed sidewalls are configured to follow a contour of one of the battery modules disposed close to the respective outlet panel; and
the first and second opposed sidewall pairs are separated from each other at least near the outlet panels;
first cooling gaps are formed between the first battery modules and inner surfaces of the opposed sidewalls;
second cooling gaps are formed between the second battery modules and inner surfaces of the opposed sidewalls opposing the second battery module;
third cooling gaps are formed between the third battery module and inner surfaces of the opposed sidewalls opposing the third battery modules; and
in each of the first and second holder cases, the conformal area, where the opposed sidewalls conform to the contour of the second battery module, of the second cooling gaps conforms to less than half a battery module perimeter, and the width of the third cooling gaps is narrower than the width of the second cooling gaps at the conformal areas.

* * * * *